United States Patent Office 3,207,599
Patented Sept. 21, 1965

1

3,207,599
NICKEL-CHROMIUM-COBALT ALLOYS
Arthur W. Franklin, Quinton, Birmingham, Ronald A. Smith, West Hagley, and Edward G. Richards, Birmingham, England, assignors to The International Nickel Company, Inc., New York, N.Y., a corporation of Delaware
No Drawing.  Filed Mar. 14, 1961, Ser. No. 95,518
Claims priority, application Great Britain, Mar. 15, 1960, 9,137/60; July 4, 1960, 23,296/60
4 Claims.  (Cl. 75—171)

The present invention relates to heat- and creep-resistant alloys and, more particularly, to nickel-chrominum-cobalt base heat- and creep-resistant alloys.

Nickel-chromium-cobalt base heat- and creep-resistant alloys containing titanium and aluminum to provide a precipitable phase of the $Ni_3(Ti, Al)$ type and also containing molybdenum are now well known. In most alloys of this type, however, it is found that the ductility decreases with increasing temperature and is generally at a minimum in the temperature range 700° C.–850° C. While these alloys in the form of thin sheet not more than about ⅛ inch thick can be welded under mild conditions and without restraint, the ductility of the welded joints decreases to an even greater extent in this temperature range, so that the elongation of the welded joints in high-temperature tensiles tests may fall below the commercially required minimum of 5% or 7% and to overcome this loss of ductility it has hitherto been necessary to apply high-temperature heat treatments after welding. The difficulty in fabricating components by welding is particularly acute when the alloys are in sheet form and are used to make components such as jet-pipes for aircraft gas turbines, since at the high temperatures that must be used for the heat treatments, the components tend to collapse or distort. Moreover, it is often difficult or impossible to apply a post-weld heat treatment when the components are repaired in service under conditions where large-scale heat treatment facilities are not available. In thicker sections and under more severe conditions of restraint and temperature such as those obtaining in the Sigma (argon-shielded consumable electrode) process welding has hitherto proved completely impractible.

Although attempts were made to overcome the foregoing difficulties and other difficulties, none, as far as we are aware, was entirely successful when carried into practice commercially on an industrial scale.

It has now been discovered that improved characteristics in welded articles or structures can be obtained by specially restricting and controlling the compositions of alloys to be welded.

It is an object of this invention to provide heat- and creep-resistant alloys that have improved weldability and largely retain their strength and ductility after welding with a simple or no post-weld heat treatment.

Another object of the invention is to provide a method of producing heat- and creep-resistant alloys that have improved weldability and largely retain their strength and ductility after welding with a simple or no post-weld treatment.

The invention also contemplates providing a novel welding process.

It is a further object of the invention to provide novel welded articles.

2

Other objects and advantages will become apparent from the following description.

Generally speaking, the present invention contemplates producing alloys and welding alloys and providing components and assemblies therefrom characterized by the fact that the alloys which are produced and/or welded have a specially restricted and controlled composition including specially restricted and controlled contents of calcium and/or magnesium. The usual practice in the manufacture of nickel-chromium-cobalt alloys is to melt the alloys in air and to deoxidize the melt by the addition of one or both of the elements magnesium and calcium and small amounts of these elements, for example, 0.008% to 0.012%, remain in the alloy after solidification. It has now surprisingly been found that even these small percentages of calcium and magnesium have an important effect in causing both cracking of the weld metal and also weakness and brittleness when the alloys are welded and according to one feature of this invention, the total content of these elements is maintained below 0.005% and preferably below 0.004% or even 0.003% by weight.

In order to keep the calcium and magnesium contents to this very low level the raw materials used, and particularly any scrap used for remelting, should be carefully selected.  On the other hand, the presence of trace amounts of calcium or magnesium or both is necessary to prevent the formation of oxide films in the cast ingots and in the weld metal and consequent unsoundness of the welds. It is almost inevitable, however, that such trace amounts, say 0.0005% to 0.001%, will be introduced into the alloy from the raw materials, so no intentional addition of these elements will generally be needed. If desired, however, further additions of calcium or magnesium may be made during melting, for example, as calcium silicide or nickel-magnesium.

To ensure that the alloys are weldable in thick sections and also have high strength and ductility both in the body of the alloy and in the weld zone, the contents of the other alloy constituents must also be controlled within narrow limits and alloys according to the invention contain (in percent by weight), in addition to the above-mentioned proportions of calcium or magnesium or both, about 0.04% to about 0.1% carbon, about 18% to about 22% chromium, about 10% to about 20% cobalt, 3% to about 5%, e.g., 5.5%, molybdenum, 2% to 2.75% titanium, 0.75% to 1.3% aluminum (the total content of titanium+aluminum being 2.75% to 3.5% and the ratio of Ti/Al being 1.75 to 2.8), 0.001% to 0.004% boron and 0.002% to 0.1% zirconium, the balance being nickel. The alloys can also contain 0% to 0.5% silicon, 0% to 1% manganese and 0% to 5% iron without serious effect on the properties.

In carrying the invention into practice, advantageous results are obtained when the composition of the alloys is maintained within the range set forth hereinbefore. The carbon content of the alloys should be as low as possible in order to maintain optimum creep resistance. On the other hand, some carbon is essential to ensure ductility in the weldments. In practice, it has been found that a satisfactory compromise between these conflicting requirements is given by a carbon content of about 0.08%, e.g., 0.05% to 0.08%. Cobalt serves to stiffen the matrix of the alloys and increase their creep resistance at high temperatures. For optimum, ductility the cobalt content should not exceed 15%, and above 20% the oxidation resistance tends to fall.

The main strengthening additions to the alloy are titanium and aluminum. The strengthening effect increases with progressive additions of these elements, but the tensile ductility of the alloys at high temperature is at the same time reduced, the loss of ductility being more severe in the weld zone than in the body of the alloy. The total content of these elements must, therefore, be restricted to lie within the narrow range 2.75% to 3.5%, and preferably it does not exced 3.1%. In addition, the Ti/Al ratio must be within the range 1.75 to 2.8. The effect of increasing the Ti/Al ratio at a given Ti+Al content is to increase the ductility; if the ratio is too low the ductility will be inadequate but if the ratio becomes too high a brittle phase may be formed.

Boron and zirconium both contribute to the creep-resistance and ductility of the alloys at high temperatures. The permissible range of boron is, however, extremely narrow, since it is surprisingly found that the amount of boron that can be present if the alloys are to be weldable is very small. Thus if the boron content exceeds 0.004% the alloys tend to crack on welding, particularly in thick sections, e.g., those greater than about 3/16 inch. To ensure that the maximum content of 0.004% is not exceeded, care should be taken that the lining of the furnace used for melting is free from boron. The desired addition is then preferably made in the form of an alloy containing a small proportion of boron, for example, an alloy containing 4% boron and 96% nickel, which gives an almost quantitative recovery of boron.

If more than 0.1% of zirconium is present, is becomes almost impossible to weld the alloys without cracking, particularly at sections greater than about 3/16 inch.

Molybdenum makes a particularly important contribution to the properties of the alloys since we find that if it is absent, the alloys crack on welding in thick sections under restrained conditions even if they contain calcium, magnesium, boron and zirconium within the ranges set forth. Thus a molybdenum-free alloy containing 0.002% Ca, 0.002% Mg, 0.004% B and 0.06% Zr that was otherwise within the composition ranges of the present invention showed severe cracking when a butt weld was made between two restrained 5/8 inch thick plates by the Sigma process. On the other hand, in molybdenum-free alloys from which boron and zirconium are also absent, much greater contents of calcium and magnesium, e.g., 0.02%, can be tolerated without cracking occurring in similar welds, but the strength of these alloys is lower than if boron and zirconium are present.

Besides giving improved weldability in the presence of boron and zirconium, molybdenum increases the strength of the alloys, as measured by their stress-rupture lives, to a level that would otherwise only be attainable by increasing the titanium and aluminum contents to an extent that would result in severe loss of ductility at high temperatures.

To obtain these advantages at least 3% of molybdenum must be present, but since increasing amounts of molybdenum impair the corrosion resistance of the alloys the content should not exced 5.5%. We have found that the optimum amount is 4.0 to 4.5%. The molybdenum may be replaced wholly or partly by an equal atomic percentage of tungsten.

Under practical conditions, silicon, manganese and iron are generally present as impurities and these elements are not added deliberately to the melt. To obtain the best welding properties the silicon content is preferably limited to less than 0.3%.

To ensure the greatest possible purity the alloys are preferably melted and cast under vacuum. It has also been found that to obtain the greatest strength and ductility of autogenous welds made in the alloys, for example, by the argon-arc process, the alloys should be held under vacuum in the molten state for some time when melting is complete, preferably for at least 10 minutes, e.g., 10 to 30 minutes, at a temperature of at least 1500° C., under a pressure not exceeding 0.5 mm. of mercury. It is believed that this treatment results in the elimination of other impurities which interfere with the welding. The nature of these impurities is, however, unknown. The most efficient purification results when the alloys are both vacuum-melted and subsequently held under vacuum. If this treatment is not carried out it is desirable to maintain the total Ti+Al content below 3.1%, as this results in higher weld ductility.

To develop optimum properties, the alloys must be heat treated before welding by solution heating at 1050° C. to 1150° C. and then air cooling. The duration of the heating depends on the section size and may be 2 to 30 minutes for sections up to 3/16 inch and 2 to 8 hours for thicker sections. This treatment should be followed by aging at 650° C. to 850° C. for 2 to 16 hours. If the alloys are to be welded, a solution heating should be applied before the welding operation is carried out, but aging before welding in unnecessary. After welding, no further solution heat treatment is in general necessary, but where maximum strength is required it may be desirable to carry out a post-weld aging treamtent consisting of heating for 2–16 hours at 650° C. to 850° C. or 900° C. preferably in the upper part of this temperature range. It is to be observed that "welding" as employed in this specification refers to a process wherein elements, structures and the like are joined by means of a fusion process during which a liquid metallic contact is established while at least the adjacent surfaces of the structures, elements, etc., to be joined are at a temperature in excess of the incipient fusion temperature of the alloy or metal from which the structure or elements are made. Subsequent cooling during which contact is maintained establishes the weld bond by freezing of the liquid contacting metal.

For the purpose of giving those skilled in the art a better understanding of the invention and/or a better appreciation of the advantages of the invention, the following illustrative examples are given. Four alloys were prepared with the compositions given (as weight percentages) in Table I. Alloy No. I was in accordance with the invention, while Nos. 2, 3 and 4 were not, Table I

|    | Alloy No. | | | |
|----|---|---|---|---|
|    | 1 | 2 | 3 | 4 |
| C  | 0.04 | 0.07 | 0.1 | 0.08 |
| Cr | 19.1 | 18.6 | 18.8 | 18.7 |
| Co | 13.9 | 11.1 | 11.2 | 10.7 |
| Mo | 5.0 | 5.02 | 5.03 | 4.62 |
| Ti | 2.13 | 2.0 | 2.14 | 2.05 |
| Al | 1.13 | 0.77 | 1.08 | 0.95 |
| Si | <.03 | 0.24 | 0.19 | 0.13 |
| Mn | <0.05 | <0.03 | 0.03 | <0.02 |
| B  | 0.003 | <0.001 | <0.001 | <0.001 |
| Zr | 0.06 | 0.02 | 0.02 | <0.02 |
| Fe | Trace | 0.28 | 0.25 | 0.17 |
| Ca | <0.002 | <0.002 | 0.002 | <0.002 |
| Mg | <0.002 | <0.002 | 0.002 | <0.002 |
| Ni | Bal. | Bal. | Bal. | Bal. |

All four alloys were made from new raw materials without any scrap addition. For alloy No. 1, these were melted under vacuum, held in the molten state for 40 minutes at a pressure of 0.001 mm. Hg at a minimum temperature of 1500° C. and then cast under vacuum. Alloys Nos. 2, 3 and 4 were melted in air, transferred to the vacuum furnace, held for 30 minutes in the molten state at 1520° C.–1580° C. under a pressure of 0.3 mm. Hg, and then cast in air.

Cast ingots of the alloys were formed into sheet 0.048 inch thick by forging and hot- and cold-rolling and solution-heated, alloy No. 1 being heated for 8 minutes at 1150° C. and alloys Nos. 2, 3 and 4 for 5 minutes at 1150° C. The specimens were tested in stress-rupture under a load of 17 tons/square inch at 750° C. Portions of the solution heated sheets were then butt-welded without filler material by the argon-arc process and aged for 4 hours at 750° C., and then again tested under the same conditions, the load being applied transversely to the weld. The results of these tests are shown in Table II.

*Table II*

| Alloy No. | Unwelded specimens. | | Welded specimens. | |
|---|---|---|---|---|
| | Life to fracture (hours) | Elongation (percent) | Life to fracture (hours) | Elongation (percent) |
| 1 | 220 | 4.1 | 198 | 3.2 |
| 2 | 177 | 3.9 | 36 | 5.5 |
| 3 | 122 | 4.3 | 0.7 | 1.4 |
| 4 | 203 | 4.1 | 35 | 3.0 |

Tensile tests on similar unwelded and welded specimens at 750° C., with the load again applied transversely to the weld, gave the results shown in Table III.

*Table III*

| Alloy No. | Unwelded specimens | | | Welded specimens | | |
|---|---|---|---|---|---|---|
| | U.T.S. (t.s.i.) | Yield stress (t.s.i.) | Elongation (percent) | U.T.S. (t.s.i.) | Yield stress (t.s.i.) | Elongation (percent) |
| 1 | 46 | 34 | 11 | 48 | 33 | 9 |
| 2 | 46 | 36 | 9 | 39 | 29 | 5 |
| 3 | 45 | 36 | 10 | 42 | 35 | 4 |
| 4 | 37 | 25 | 17 | 43 | 33 | 5 |

U.T.S.=Ultimate tensile stress.
t.s.i.=long tons/square inch.

The results in Tables II and III show that the stress-rupture properties of alloy No. 1 in the welded state were only slightly inferior to those in the unwelded state, and that this alloy suffered a drop in tensile ductility of only 2% when it was welded. In contrast to this, the other alloys all exhibited markedly inferior stress-rupture lives and tensile ductilities in the welded state. These alloys all contained less than 0.001% boron.

Comparison of the properties of aloys Nos. 2, 3 and 4 also shows the advantage of maintaining the Ti+Al content low. The stress-rupture properties and the tensile elongation of alloy No. 3, which had a Ti+Al content greater than 3.1%, suffered on welding to a much greater extent than those of alloys Nos. 2 and 4, which had Ti+Al contents less than 3.1%.

Alloys Nos. 1 and 2 were also subjected to a thermal fatigue test using a load of 8 long tons/square inch and a maximum temperature of 780° C. Under these conditions, a welded and aged specimen of alloy No. 1 had a life to fracture of 4000 cycles, whereas a similar specimen of alloy No. 2 fractured after only 800 cycles.

While the alloys of the invention are particularly suitable for use in the form of sheet, they can also be used with advantage in the wrought form. In particular, they can be used in the manufacture of composite welded structures, for example, sheet components with wrought stiffening members welded to them. Typical of the welded structures in which the alloys may be used are parts of aircraft gas turbines such as jet pipes, flame tubes and jet silencers, and steam pipe assemblies for use in contact with superheated steam.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A weldable, creep-resistant nickel-chromium-cobalt base alloy characterized by being weldable not only in thick sections but also in the form of sheet having thicknesses of ⅛ inch or less, said alloy consisting essentially, by weight, of about 0.04% to about 0.1% carbon, about 18% to about 22% chromium, about 10% to about 20% cobalt, at least one metal selected from the group consisting of molybdenum and tungsten in a total atomic concentration equivalent to an atomic concentration in the alloy of about 3% to 5.5% by weight of molybdenum, about 2% to about 2.75% titanium, about 0.75% to about 1.3% aluminum, the total percentage of said titanium and said aluminum being about 2.75% to about 3.5% and the ratio of the percentage of said titanium to the percentage of said aluminum being about 1.75 to about 2.8, from 0.001% to 0.004% boron, about 0.002% to 0.1% zirconium, up to about 0.5% silicon, up to about 1% manganese, up to 5% iron, at least one metal from the group consisting of calcium and magnesium and mixtures thereof in an amount sufficient to prevent the forming of oxide films in casting of an ingot and in weld metal when the alloy is used in welding processes but not exceeding 0.005%, and the balance essentially nickel.

2. An alloy as set forth and defined in claim 1 wherein the sum of the titanium percentage and the aluminum percentage is below about 3.1%.

3. A weldable, creep-resistant nickel-chromium-cobalt base alloy characterized by being weldable not only in thick sections but also in the form of sheet having thicknesses of ⅛ inch or less, said alloy consisting essentially, by weight, of about 0.04% to about 0.08% carbon, about 18% to about 22% chromium, about 10% to about 20% cobalt, about 3% to about 4.5% molybdenum, about 2% to about 2.75% toitanium, about 0.75% to about 1.3% aluminum, the total percentage of said titanium and said aluminum being about 2.75% to about 3.5% and the ratio of the percentage of said titanium to the percentage of said aluminum being about 1.75 to about 2.8, from 0.001% to 0.004% boron, about 0.002% to 0.1% zirconium, up to about 0.5% silicon, upon about 1% manganese, up to 5% iron, at least one metal from the group consisting of calcium and magnesium and mixtures thereof in an amount sufficient to prevent the forming of oxide films in casting of an ingot and in weld metal when the alloy is used in welding processes but not exceeding 0.003%, and the balance essentially nickel.

4. As a new article of manufacture, a welded structure subjected in use to prolonged stress in the temperature range of 700° C. to 850° C. and having at least one element made of the alloy as set forth in claim 1.

References Cited by the Examiner

UNITED STATES PATENTS

| | | | |
|---|---|---|---|
| 2,048,167 | 7/36 | Pilling | 75—171 |
| 2,254,792 | 9/41 | Brown | 29—484 |
| 2,432,619 | 12/47 | Franks et al. | 75—171 |
| 2,487,304 | 11/49 | Brauchler | 148—12 |
| 2,513,472 | 7/50 | Franks et al. | 75—171 |
| 2,701,778 | 2/55 | Vickery | 148—12 |
| 2,747,993 | 5/56 | Johnson | 75—171 |
| 2,778,099 | 1/57 | Anderson et al. | 29—484 |
| 2,805,154 | 9/57 | Moore | 75—171 |
| 2,809,110 | 10/57 | Darmara | 75—171 |
| 2,920,956 | 1/60 | Nisbet et al. | 75—171 |
| 2,977,222 | 3/61 | Beiber | 75—171 |

FOREIGN PATENTS 203,683   3/55   Australia.

OTHER REFERENCES

Thompson: "Nickel and Its Alloys," National Bureau of Standards Circular 592, issued February 5, 1958, pp. 27–28.

DAVID L. RECK, *Primary Examiner.*

MARCUS U. LYONS, WINSTON A. DOUGLAS,
*Examiners.*

UNITED STATES PATENT OFFICE
CERTIFICATE OF CORRECTION

Patent No. 3,207,599                                September 21, 1965

Arthur W. Franklin et al.

It is hereby certified that error appears in the above numbered patent requiring correction and that the said Letters Patent should read as corrected below.

Column 1, line 13, for "nickel-chrominum-" read -- nickel-chromium- --; line 27, for "tensiles" read -- tensile --; line 44, for "impractible" read -- impracticable --; column 2, line 66, after "optimum" strike out the comma; column 3, line 6, for "temperature" read -- temperatures --; lines 11 and 61, for "exced", each occurrence, read -- exceed --; same column 3, line 32, for "is", second occurrence, read -- it --; column 4, line 25, for "treamtent" read -- treatment --; same column 4, Table I, under column heading "1", line 7 thereof, for "$<.03$" read -- $<0.3$ --; column 5, line 52, for "aloys" read -- alloys --; column 6, line 61, for "toitanium" read -- titanium --.

Signed and sealed this 27th day of September 1966.

(SEAL)
Attest:

ERNEST W. SWIDER                              EDWARD J. BRENNER
Attesting Officer                            Commissioner of Patents